United States Patent
Keefe et al.

(10) Patent No.: US 12,286,210 B2
(45) Date of Patent: Apr. 29, 2025

(54) SYSTEM AND METHOD FOR SECURING A STRUCTURAL MEMBER TO A WING AND A FUSELAGE OF AN AIRCRAFT

(71) Applicant: THE BOEING COMPANY, Chicago, IL (US)

(72) Inventors: Drew-Daniel T. Keefe, Maple Valley, WA (US); Jeff S. Hollowell, Seattle, WA (US)

(73) Assignee: The Boeing Company, Chicago, IL (US)

( * ) Notice: Subject to any disclaimer, the term of this patent is extended or adjusted under 35 U.S.C. 154(b) by 118 days.

(21) Appl. No.: 17/464,801

(22) Filed: Sep. 2, 2021

(65) Prior Publication Data

US 2022/0135202 A1  May 5, 2022

Related U.S. Application Data

(60) Provisional application No. 63/108,972, filed on Nov. 3, 2020.

(51) Int. Cl.
*B64C 1/26* (2006.01)
*B64C 1/06* (2006.01)

(52) U.S. Cl.
CPC ............... *B64C 1/26* (2013.01); *B64C 1/064* (2013.01)

(58) Field of Classification Search
CPC .................................. B64C 1/26; B64C 1/064
See application file for complete search history.

(56) References Cited

U.S. PATENT DOCUMENTS

| | | | | |
|---|---|---|---|---|
| 6,679,452 B1 * | 1/2004 | Cottet | .................... | B64C 25/04 244/102 R |
| 7,083,143 B2 * | 8/2006 | Whitmer | ................ | B64D 27/18 244/54 |
| 8,360,359 B2 * | 1/2013 | Llamas Sandin | ........ | B64C 5/02 244/87 |
| 8,740,150 B2 * | 6/2014 | Werth | ....................... | B64C 1/26 244/131 |
| 8,857,765 B2 * | 10/2014 | Thomas | .................... | B64C 1/26 244/119 |
| 8,991,762 B2 * | 3/2015 | Voss | ......................... | B64C 1/26 244/119 |

(Continued)

FOREIGN PATENT DOCUMENTS

| | | |
|---|---|---|
| DE | 102006051572 | 5/2008 |
| EP | 3178737 | 6/2017 |

(Continued)

OTHER PUBLICATIONS

Wikipedia, Longeron, p. 1, (retrieved on Jul. 10, 2023 ).*
Extended European Search Report for EP 21198322.6-1010, dated Feb. 23, 2022.

*Primary Examiner* — Richard Green
*Assistant Examiner* — Nevena Aleksic
(74) *Attorney, Agent, or Firm* — Joseph M. Butscher; The Small Patent Law Group LLC

(57) ABSTRACT

A system and a method for securing a portion of a fuselage of an aircraft to a portion of a wing of the aircraft include a longeron having a first end and a second end, a first moveable coupling interface that moveably secures the first end to the portion of the fuselage, and a second moveable coupling interface that moveably secures the second end to the portion of the wing.

20 Claims, 5 Drawing Sheets

(56) References Cited

U.S. PATENT DOCUMENTS

| | | | | |
|---|---|---|---|---|
| 9,248,902 B2* | 2/2016 | Benthien | ............ | B64C 1/26 |
| 9,399,508 B2* | 7/2016 | Lakic | ............ | B64C 1/26 |
| 2009/0146007 A1 | 6/2009 | Keeler | | |
| 2018/0072401 A1* | 3/2018 | Ückert | ............ | B64C 3/28 |
| 2020/0023936 A1* | 1/2020 | Gardner | ............ | B64C 1/18 |
| 2020/0189714 A1* | 6/2020 | Murphy | ............ | B64F 5/10 |

FOREIGN PATENT DOCUMENTS

| | | |
|---|---|---|
| EP | 3461737 | 4/2019 |
| KR | 20180115217 | 10/2019 |

* cited by examiner

SYSTEM AND METHOD FOR SECURING A STRUCTURAL MEMBER TO A WING AND A FUSELAGE OF AN AIRCRAFT

CROSS-REFERENCE TO RELATED APPLICATIONS

This application relates to and claims priority benefits from U.S. Provisional Application No. 63/108,972, entitled "System and Method for Securing a Longeron to a Wing and a Fuselage of an Aircraft," filed Nov. 3, 2020, which is hereby incorporated by reference in its entirety.

FIELD OF THE DISCLOSURE

Examples of the subject disclosure generally relate to aircraft, and more particularly to a system and a method for securing an under-wing longeron to a wing and a fuselage of an aircraft.

BACKGROUND OF THE DISCLOSURE

Aircraft include various structural members that form portions of a fuselage. For example, a longeron is a fore and aft structural member that is used to form a portion of a fuselage. The longeron is a load-bearing portion of a framework, such as a fuselage of an aircraft.

Certain known under-wing longerons may experience physical irregularities, such as can be caused by deflection-induced bending moments caused by complex load paths in an area of the aircraft where a mismatch between wing and fuselage motion is acute and appreciable. Typical under-wing longeron configurations are built up assemblies including several fasteners that fix all degrees of translation and rotation between the wing and fuselage. For example, the longeron is typically fixed along its length at points on the wing and/or fuselage through numerous fasteners.

Under load, the wing may move in a substantially different fashion than the fuselage, imposing appreciable induced moments about the vertical and horizontal axes on the under-wing longeron. These moments are resolved through rigid attachments to the wing and fuselage supporting structure. The resulting loads on the under-wing longeron and attachments are complex and difficult to characterize. Further, due to the imposed deflection nature of such loading, appropriate sizing is complicated by the fact that stronger and stiffer structure attracts more load in an imposed deflection loading environment. The challenge in relation to properly characterizing the load paths and subsequently sizing for the loading environment may cause irregularities in relation to the under-wing longeron.

Moreover, the build process requires several attachment fasteners that are to be drilled and installed in a final assembly, increasing factory flow times. Accordingly, the process of securing an under-wing longeron to a wing and a fuselage is typically time and labor intensive.

SUMMARY OF THE DISCLOSURE

A need exists for a longeron that is configured to readily adapt to forces exerted on and in relation to a fuselage and a wing. Further, a need exists for a longeron that can be quickly and efficiently secured to a fuselage and a wing.

With those needs in mind, certain examples of the subject disclosure provide a system for securing a portion of a fuselage of an aircraft to a portion of a wing of the aircraft. The system includes a longeron having a first end and a second end, a first moveable coupling interface that moveably secures the first end to the portion of the fuselage, and a second moveable coupling interface that moveably secures the second end to the portion of the wing.

As an example, the portion of the wing is an underside of the wing that is aft in relation to a front edge of the wing. As a further example, the portion of the fuselage is in front of and below the wing.

In at least one example, the fuselage includes a first support fitting that secures to the first moveable coupling interface. The wing includes a second support fitting that secures to the second moveable coupling interface.

In at least one example, one or both of the first moveable coupling interface or the second moveable coupling interface includes a spherical bearing moveably retained within a reciprocal bushing. As a further example, one or both of the spherical bearing or the reciprocal bushing are secured to the portion of the fuselage or the portion of the wing.

In at least one example, the first end and the second end are not rigidly fixed in position with respect to the fuselage and the wing. Further, a length of the longeron between the first end and the second end is free. Additionally, the length of the longeron is devoid of fasteners.

Certain examples of the subject disclosure provide a method for securing a portion of a fuselage of an aircraft to a portion of a wing of the aircraft. The method includes moveably securing, by a first moveable coupling interface, a first end of a longeron to the portion of the fuselage; and moveably securing, by a second moveable coupling interface, a second end of the longeron to the portion of the wing.

Certain examples of the subject disclosure provide an aircraft including a fuselage, a wing coupled to the fuselage, and a system for securing a portion of the fuselage of to a portion of the wing, as described herein.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Certain examples of the subject disclosure provide a system and a method for securing a portion of a wing of an aircraft to a portion of a fuselage. In at least one example, the system and method include a longeron linked to an aft end connecting to a lug fitting on an underside of the wing center section lower panel and a forward end connecting to a lug fitting on a fuselage frame forward of a wing front spar. In at least one embodiment, the system and method include a pin-ended structure at such locations. The use of spherical bearings at the two points of attachment result in a two-force member under-wing longeron with subsequent load paths that are significantly simplified compared to the traditional design. The system and method also reduce the amount of deflection induced loading on the longeron and supporting structures.

Structure can be sized for applied loads with little regard for induced loads. The amount of time required to install the longeron in final assembly is also greatly improved by the removal of drill and fill operations.

By using a pin-ended design, the longeron is relieved of induced moments and can better fulfill its structural purpose, which is to provide a fore/aft load path between the fuselage and wing. Additionally, this configuration serves as an enabler to reduce production system flow time in wing to body join processes. Traditional architectures require drilling assembly operations to install the under-wing longeron. This configuration simplifies and expedites the wing to body join procedure by eliminating or otherwise reducing drilling operations in this position and replacing them with simple pin installation, pin joint clamp up, and pin retention operations which are much easier and faster to complete.

Figure 1:
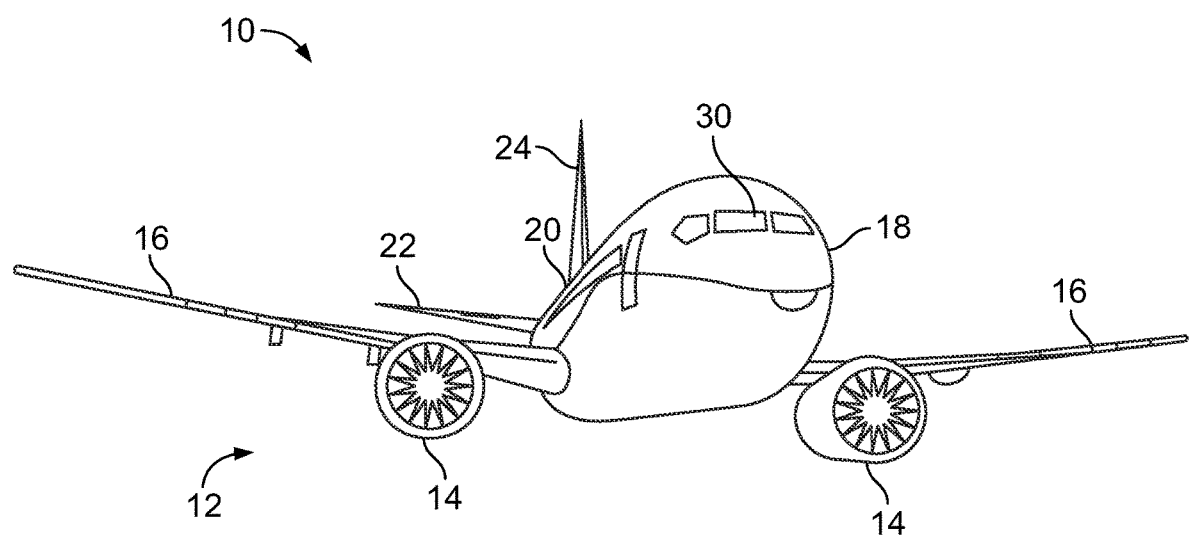
FIG. 1 illustrates a perspective front view of an aircraft, according to an example of the subject disclosure.

FIG. 1 illustrates a perspective front view of an aircraft 10, according to an embodiment of the present disclosure. The aircraft 10 includes a propulsion system 12 that includes engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24. The fuselage 18 of the aircraft 10 defines an internal cabin 30, which includes a flight deck or cockpit.

The aircraft 10 can be sized, shaped, and configured other than shown. As described herein, the aircraft 10 includes a system for securing a portion of a wing 16 to the fuselage 18.

Figure 2:
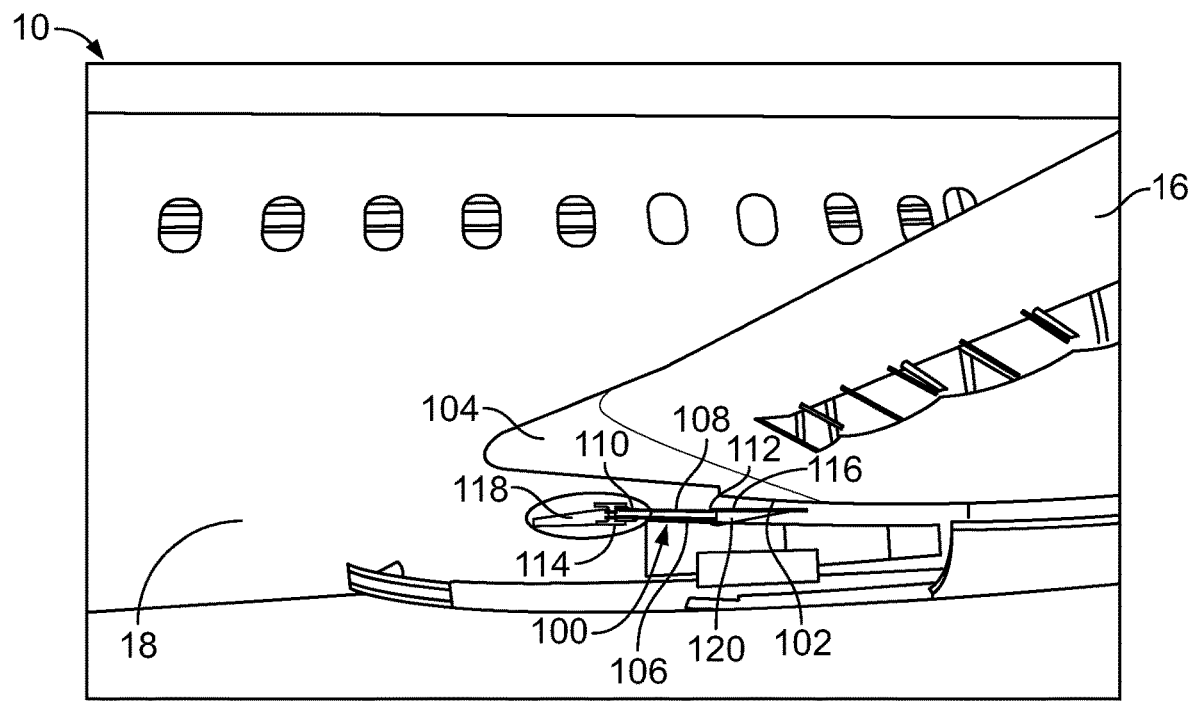
FIG. 2 illustrates a perspective lateral view of the aircraft, according to an example of the subject disclosure.

FIG. 2 illustrates a perspective lateral view of the aircraft 10, according to an example of the subject disclosure. The aircraft 10 includes a system 100 for securing a portion of the wing 16 to a portion of the fuselage 18. In at least one example, the portion of the wing 16 is an underside 102 of the wing 16 that is aft (that is behind) in relation to a front edge 104. The portion of the wing 16 can be between the front edge 104 and a rear edge (not shown in FIG. 2). The portion of the fuselage 18 is fore (that is, in front) and below the wing 16. As another example, the portion of the fuselage 18 can be above the wing 16. As another example, the portion of the fuselage can be aft (that is, behind) and below or above the wing 16.

The system 100 includes a longeron 106 having a longitudinal main body 108. The main body 108 extends between a first end 110 and a second end 112 of the longeron 106. The main body 108 can be a linear beam, rod, bar, and/or the like. The system 100 further includes a first moveable coupling interface 114 that moveably secures the first end 110 to the portion of the fuselage 18, and a second moveable coupling interface 116 that moveably secures the second end 112 to the portion of the wing 16.

In at least one embodiment, the first moveable coupling interface moveably secured in the first end 110 and the second moveable coupling interface moveably secured in the second end 112 are able to freely rotate in any direction. However, while the coupling interfaces are able to freely rotate, the coupling interfaces are axially constrained (that is, not able to axially shift or translate in any direction). Alternatively, the coupling interfaces can freely rotate and translate, at least to some extent.

In at least one example, the fuselage 18 includes a support fitting (such as a first support fitting) 118 that secures to the first moveable coupling interface 114. In at least one example, the support fitting 118 includes at least a portion of the first moveable coupling interface 114. Further, the wing 16 includes a support fitting (such as a second support fitting) 120 that secures to the second moveable coupling interface 116. In at least one example, the supporting fitting 120 includes at least a portion of the first moveable coupling interface 114.

In at least one example, the first moveable coupling interface 114 includes a spherical bearing moveably secured within a reciprocal bushing. For example, the first end 110 of the longeron 106 includes a clevis and/or lug that couples to the spherical bearing moveably retained within a reciprocal bushing secured to the support fitting 118, or vice versa. As another example, the first end 110 includes the spherical bearing, and the support fitting 118 includes the reciprocal bushing, or vice versa. The spherical bearing is received and moveably retained within the bushing. In at least one example, the bushing is secured in position by a pin fastener, such as a bolt, lug, and/or the like. In at least one embodiment, the spherical bearing is integrally inside of a reciprocal bushing. The spherical bearing is installed in base material, just as the bushing is.

In at least one embodiment, the spherical bushing is installed on a lug side of a joint in a bore of a fitting lug, and bushings are installed in a clevis side of the joint in a bore of a fitting clevis. The lug can be on either the wing or fuselage attachment structure, or an underwing longeron member with the clevis on an opposing member of the joint. The spherical bearing is retained by the lug.

Further, as an example, the second moveable coupling interface 116 includes a spherical bearing moveably secured within a reciprocal bushing. For example, the second end 112 of the longeron 106 includes a clevis and/or lug that couples to the spherical bearing moveably retained within a reciprocal bushing secured to the support fitting 120, or vice versa. As another example, the second end 112 of the longeron 106 includes the reciprocal bushing, and the support fitting 120 includes the spherical bearing, or vice versa. The spherical bearing is received and moveably retained within the bushing. In at least one example, the bushing is secured in position by a pin fastener, such as a bolt, lug, and/or the like.

The use of spherical bearings at the first moveable coupling interface 114 and the second moveable coupling interface 116 (that is, the two points of attachment) results in a two-force member under-wing longeron with subsequent load paths that are significantly simplified as compared to a traditional design. The system and method also reduce the amount of deflection induced loading on the longeron and supporting structures.

Figure 3:
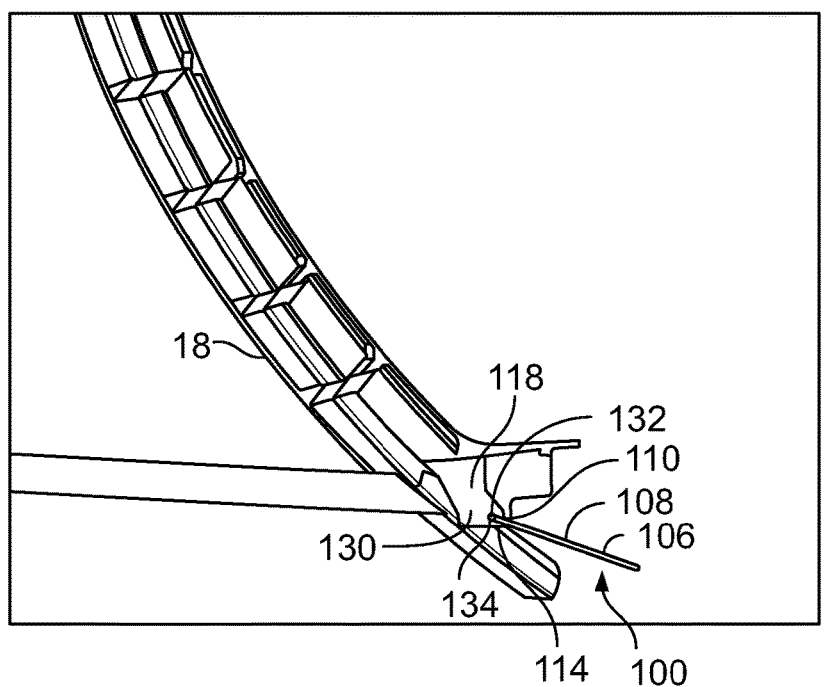
FIG. 3 illustrates a lateral view of a longeron coupled to a portion of a fuselage, according to an example of the subject disclosure.

FIG. 3 illustrates a lateral view of the longeron 106 coupled to the portion of the fuselage 18, according to an example of the subject disclosure. As an example, the support fitting 118 includes a flange 130 that includes a fastener opening 132 that receives a pin 134 (such as a bolt) that secures a bushing of the first moveable coupling interface 114 to the support fitting 118.

Figure 4:
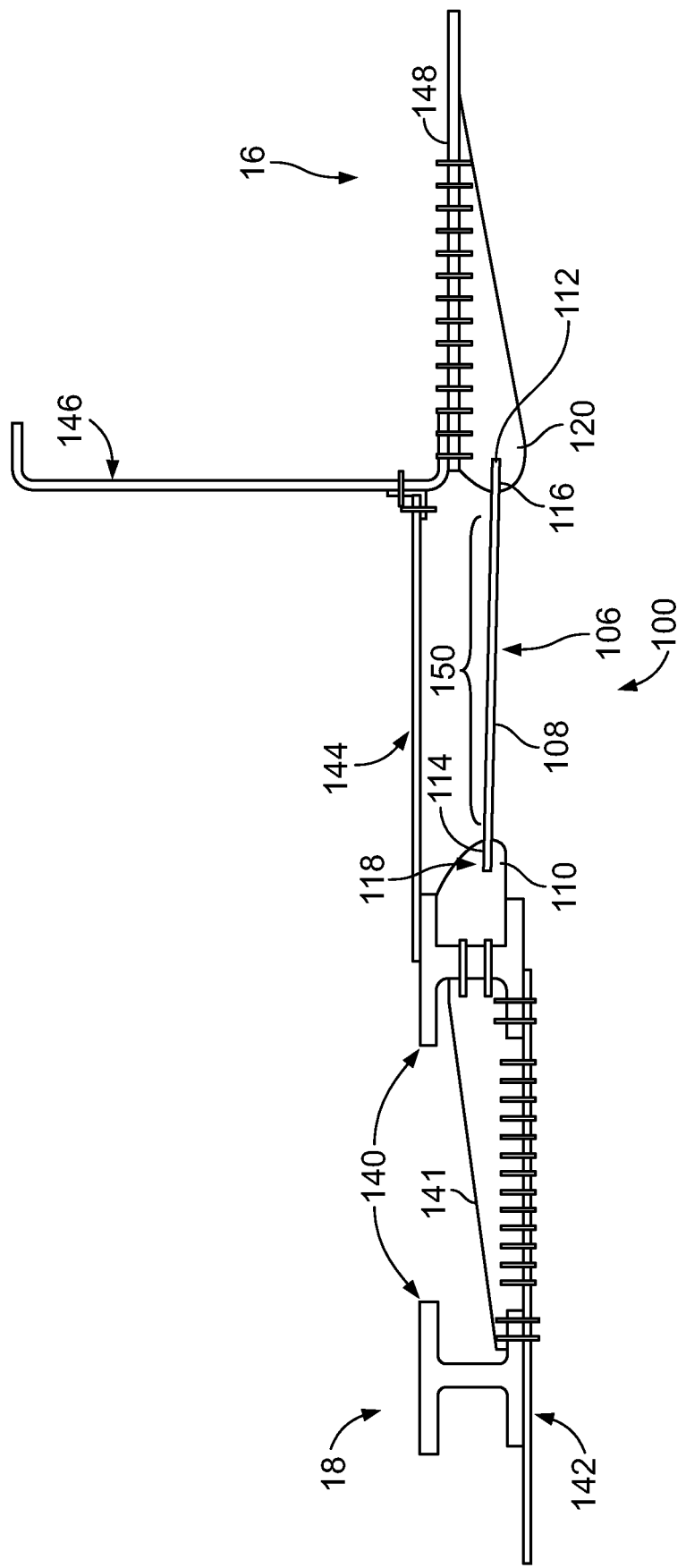
FIG. 4 illustrates a schematic diagram of a system for securing a portion of a wing to a portion of a fuselage, according to an example of the subject disclosure.

FIG. 4 illustrates a schematic diagram of the system 100 for securing a portion of the wing 16 to a portion of the fuselage 18, according to an example of the subject disclosure. In at least one example, the fuselage 18 includes a plurality of frames 140. A backup support fitting 141 is secured between the frames 140. The support fitting 118 extends outwardly from a frame 140, such as the frame 140 closest to the wing 16. The support fitting 118 can be integrally formed with the frame 140, or separately secured to the frame 140. A skin 142 is secured underneath the frames 140.

A cheek panel 144 secures to the frame 140 closest to the wing 16 and a front spar 146 of the wing 16. A lower panel 148 of the wing 16 connects below the front spar 146. The support fitting 118 is secured below the lower panel 148.

As shown, the longeron 106 (such as an under-wing or over-wing longeron) extends between the portion of the fuselage 18 and the portion of the wing 16. The first end 110 and the second end 112 are not rigidly fixed in position (that is, not constrained from moving) with respect to the fuselage 18 and the wing 16. Instead, the first end 110 and the second end 112 are able to move through multiple degrees of freedom via the first moveable coupling interface 114 and the second moveable coupling interface 116, respectively.

A length 150 of the longeron 106 between the first end 110 and the second end 112 is free. That is, the portion of the main body 108 between the first end 110 and the second end 112 (that is, the length 150 of the longeron 106) is not fixed in position to either the fuselage 18 or the wing 16, such as through fasteners. Instead, the length 150 of the longeron 106 is devoid of fasteners or other such structure that fixes the longeron 106 in place. The length 150 of the longeron 106 is free to move by way of the first moveable coupling interface 114 and the second moveable coupling interface 116.

The first end 110 and the second end 112 include at least a portion of the first moveable coupling interface 114 and the second moveable coupling interface 116, respectively. In at least one example, the portions of the first moveable coupling interface 114 and the second moveable coupling interface 116 are the first end 110 and the second end 112. The first end 110 and the second end 112 are those portions that directly couple to reciprocal portions of the fuselage 18 and the wing 16, such as through the reciprocal portions of the first moveable coupling interface 114 and the second moveable coupling interface 116, respectively.

As indicated, the first moveable coupling interface 114 and the second moveable coupling interface 116 include spherical bearings. The spherical bearings allow for rotation about any axis, thereby eliminating or reducing induced moments due to deflection mismatch between the fuselage 18 and the wing 16, while at the same time preserving the forward/aft load path through the longeron 106. The bushings, such as eccentric bushings, allow build tolerances to be addressed by clocking of the bushings during installation. A final assembly operation includes clocking of bushings, installation of pins, clamp-up of joint, and installation retention features. No drilling operations are required, thereby reducing manufacturing time and costs.

In at least one embodiment, eccentric bushings can be used to adjust for build tolerances. The eccentric bushings can be installed in both prongs, ears, or the like of a clevis.

Figure 5:
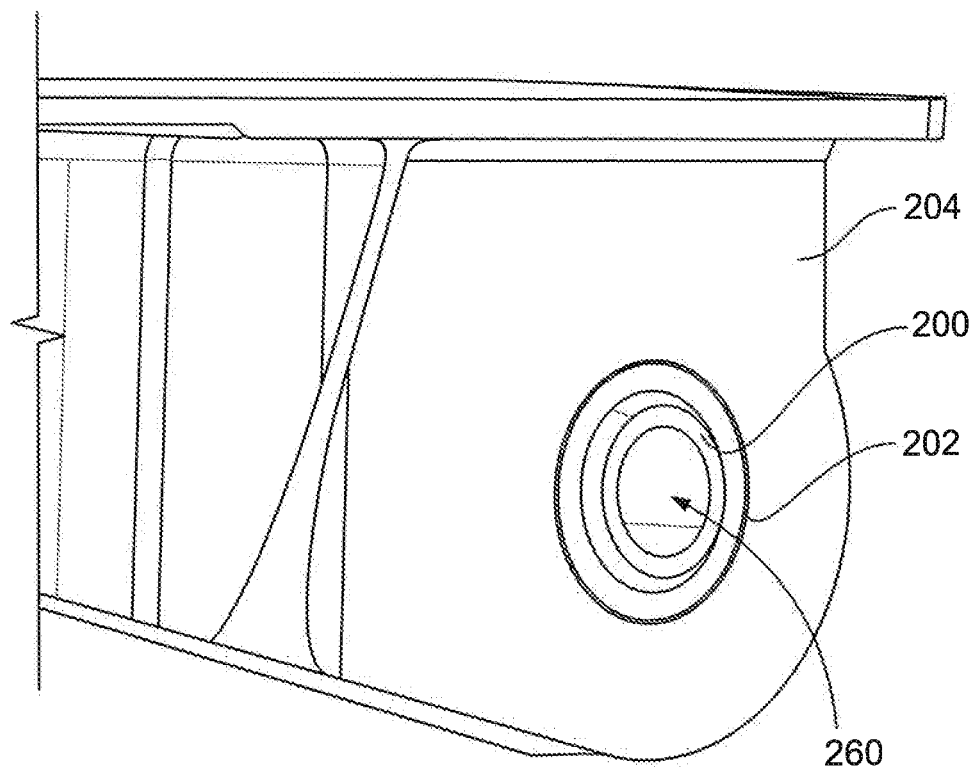
FIG. 5 illustrates a perspective end view of a spherical bearing retained within a bushing, according to an example of the subject disclosure.

FIG. 5 illustrates a perspective end view of a spherical bearing 200 retained within a bushing 202, according to an example of the subject disclosure. The spherical bearing 200 is rotatably retained within the bushing 202. The bushing 202 can be secured to a support fitting 204, such as the support fitting 118 or the support fitting 120 shown in FIGS. 2-4. Optionally, the bushing 202 can be secured to an end of the longeron 106, such as the end 110 or 112, such as shown in FIGS. 2-4.

Figure 6:
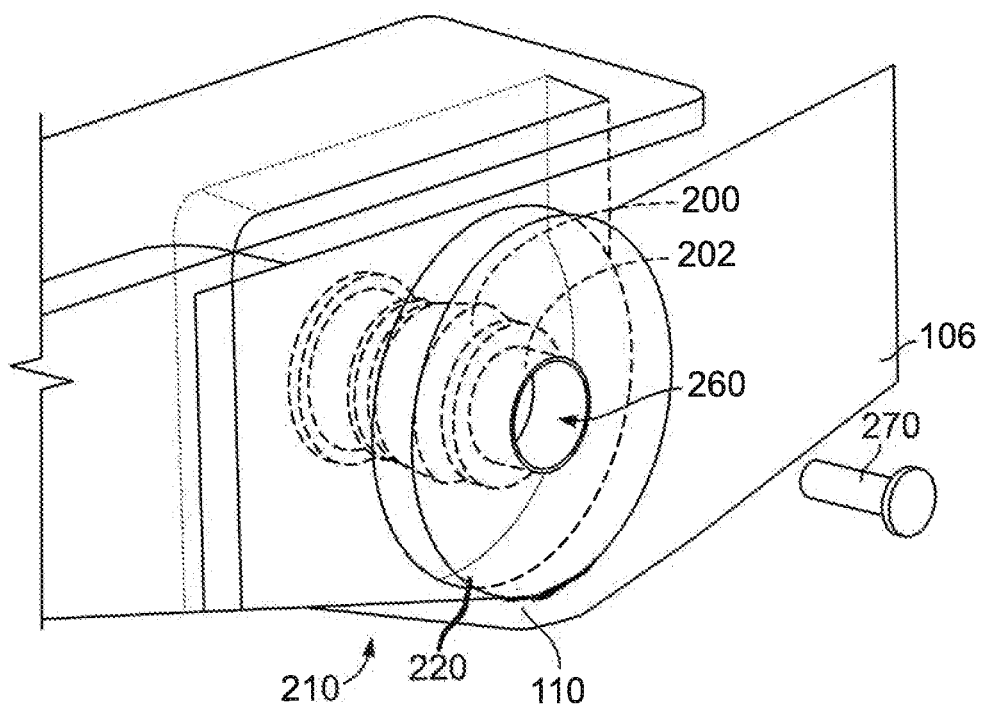
FIG. 6 illustrates a perspective view of a moveable coupling interface, according to an example of the subject disclosure.

FIG. 6 illustrates a perspective view of a moveable coupling interface 210, according to an example of the subject disclosure. For the sake of clarity, portions of the moveable coupling interface 210 and the support fitting 204 are shown transparent. The moveable coupling interface 210 is an example of the first moveable coupling interface 114 or the second moveable coupling interface 116, shown in FIGS. 2-4. In an example, the first end 110 (or the second end 112) of the longeron 106 includes a clevis 220 that couples to one or both of the spherical bearing 200 and/or the bushing 202.

Referring to FIGS. 5 and 6, the bushing 202 and/or the bearing 200 can include pin passages 260. For example, the bushing 202 and the bearing 200 can include coaxial pin passages 260. The pin passages 260 are configured to receive and retain one or more pins 270 (for example, a first pin 270 at one side, and a second pin 270 at an opposite side) that are configured secure the moveable coupling interface 210 in place in relation to the fuselage 18 or the wing 16 (shown in FIGS. 1-4). In another example, the pins 270 are nested inside of bores of larger pins.

Optionally, the moveable coupling interface 210 may be sized, shaped and configured similarly or differently than shown. For example, the moveable coupling interface 210 can be a ball and socket connection.

Figure 7:
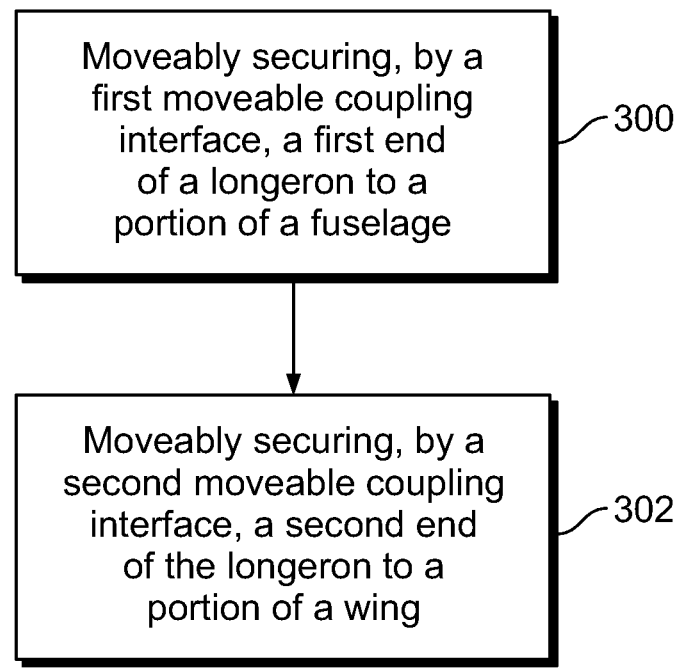
FIG. 7 illustrates a flow chart of a method for securing a portion of a fuselage to a portion of a wing, according to an example of the subject disclosure.

FIG. 7 illustrates a flow chart of a method for securing a portion of a fuselage of an aircraft to a portion of a wing of the aircraft. The method includes moveably securing, at 300, by a first moveable coupling interface, a first end of a longeron to the portion of the fuselage; and moveably securing, at 302, by a second moveable coupling interface, a second end of the longeron to the portion of the wing. In at least one example, the method also includes securing a first support fitting of the fuselage to the first moveable coupling interface; and securing a second support fitting of the wing to the second moveable coupling interface. In at least one other embodiment, a sequence of installation is reversed from what is shown and described with respect to FIG. 7.

As described herein, examples of the subject disclosure provide a longeron that is configured to readily adapt to forces exerted on and in relation to a fuselage and a wing. Further, examples of the subject disclosure provide a longeron that can be quickly and efficiently secured to a fuselage and a wing without the need for drilling operations, such as in the final assembly process of joining the fuselage to the wing, for example.

Further, the disclosure comprises embodiments according to the following clauses:

Clause 1. A system for securing a portion of a fuselage of an aircraft to a portion of a wing of the aircraft, the system comprising:

a longeron having a first end and a second end;

a first moveable coupling interface that moveably secures the first end to the portion of the fuselage; and a second moveable coupling interface that moveably secures the second end to the portion of the wing.

Clause 2. The system of Clause 1, wherein the portion of the wing is an underside of the wing that is aft in relation to a front edge of the wing.

Clause 3. The system of Clauses 1 or 2, wherein the portion of the fuselage is in front of and below the wing.

Clause 4. The system of any of Clauses 1-3, wherein the fuselage comprises a first support fitting that secures to the first moveable coupling interface, and wherein the wing comprises a second support fitting that secures to the second moveable coupling interface.

Clause 5. The system of any of clauses 1-4, wherein one or both of the first moveable coupling interface or the second moveable coupling interface comprises a spherical bearing moveably retained within a reciprocal bushing.

Clause 6. The system of Clause 5, wherein one or both of the spherical bearing or the reciprocal bushing are secured to the portion of the fuselage or the portion of the wing.

Clause 7. The system of any of Clauses 1-6, wherein the first end and the second end are not rigidly fixed in position with respect to the fuselage and the wing.

Clause 8. The system of any of Clauses 1-7, wherein a length of the longeron between the first end and the second end is free.

Clause 9. The system of Clause 8, wherein the length of the longeron is devoid of fasteners.

Clause 10. A method for securing a portion of a fuselage of an aircraft to a portion of a wing of the aircraft, the method comprising:

moveably securing, by a first moveable coupling interface, a first end of a longeron to the portion of the fuselage; and moveably securing, by a second moveable coupling interface, a second end of the longeron to the portion of the wing.

Clause 11. The method of Clause 10, wherein the portion of the wing is an underside of the wing that is aft in relation to a front edge of the wing.

Clause 12. The method of Clauses 10 or 11, wherein the portion of the fuselage is in front of and below or above the wing.

Clause 13. The method of any of Clauses 10-12, further comprising:

securing a first support fitting of the fuselage to the first moveable coupling interface; and securing a second support fitting of the wing to the second moveable coupling interface.

Clause 14. The method of any of Clauses 10-13, wherein one or both of the first moveable coupling interface or the second moveable coupling interface comprises a spherical bearing moveably retained within a reciprocal bushing.

Clause 15. The method of Clause 14, further comprising securing one or both of the spherical bearing or the reciprocal bushing to the portion of the fuselage or the portion of the wing.

Clause 16. The method of any of Clauses 10-15, wherein the first end and the second end are not rigidly fixed in position with respect to the fuselage and the wing.

Clause 17. The method of any of Clauses 10-16, wherein a length of the longeron between the first end and the second end is free.

Clause 18. The method of Clause 17, wherein the length of the longeron is devoid of fasteners.

Clause 19. An aircraft, comprising:

a fuselage;

a wing coupled to the fuselage; and a system for securing a portion of the fuselage of to a portion of the wing, the system comprising:

a longeron having a first end and a second end;

a first moveable coupling interface that moveably secures the first end to the portion of the fuselage; and a second moveable coupling interface that moveably secures the second end to the portion of the wing, wherein one or both of the first moveable coupling interface or the second moveable coupling interface comprises a spherical bearing moveably retained within a reciprocal bushing, wherein the first end and the second end are not rigidly fixed in position with respect to the fuselage and the wing, wherein a length of the longeron between the first end and the second end is free, and wherein the length of the longeron is devoid of fasteners.

Clause 20. The aircraft of Clause 19, wherein the portion of the wing is an underside of the wing that is aft in relation to a front edge of the wing, and wherein the portion of the fuselage is in front of and below or above the wing.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system for securing a portion of a fuselage of an aircraft to a portion of a wing of the aircraft, wherein the fuselage comprises a first support fitting including a first flange, and wherein the wing comprises a second support fitting including a second flange, the system comprising:
   a structural member including a linear main body extending between a first end and a second end, wherein the first end includes a first clevis, and the second end includes a second clevis;
   a first moveable coupling interface that moveably secures the first end to the portion of the fuselage, wherein the first moveable coupling interface is configured to secure to the first support fitting, wherein the first moveable coupling interface comprises a first spherical bearing rotatably retained within a first eccentric bushing, and wherein the first clevis couples to one or both of the first spherical bearing or the first eccentric bushing;
   a first pin coupled to the first eccentric bushing, wherein the first pin is configured to secure the first eccentric bushing to the first support fitting;
   a second moveable coupling interface that moveably secures the second end to the portion of the wing, the second moveable coupling interface is configured to secure to the second support fitting, wherein the second moveable coupling interface comprises a second spherical bearing rotatably retained within a second eccentric bushing, and wherein the second clevis couples to one or both of the second spherical bearing or the second eccentric bushing; and
   a second pin coupled to the second eccentric bushing, wherein the second pin is configured to secure the second eccentric bushing to the second support fitting.

2. The system of claim 1, wherein the portion of the wing is an underside of the wing that is aft in relation to a front edge of the wing.

3. The system of claim 1, wherein the portion of the fuselage is in front of and below the wing.

4. The system of claim 1, wherein a length of the structural member between the first end and the second end is free.

5. The system of claim 4, wherein the length of the structural member is devoid of fasteners.

6. A method for securing a portion of a fuselage of an aircraft to a portion of a wing of the aircraft, wherein the fuselage comprises a first support fitting including a first flange, and wherein the wing comprises a second support fitting including a second flange, the method comprising:
   moveably securing, by a first moveable coupling interface, a first end of a structural member to the portion of the fuselage, wherein the first end includes a first clevis, wherein the first moveable coupling interface comprises a first spherical bearing rotatably retained within a first eccentric bushing, and wherein the first clevis couples to one or both of the first spherical bearing or the first eccentric bushing;
   securing the first moveable coupling interface to the first support fitting of the fuselage;
   coupling, by a first pin, the first eccentric bushing of the first moveable coupling interface to the first support fitting of the fuselage;
   moveably securing, by a second moveable coupling interface, a second end of the structural member to the portion of the wing, wherein the second end includes a second clevis, wherein the second moveable coupling interface comprises a second spherical bearing rotatably retained within a second eccentric bushing, and wherein the second clevis couples to one or both of the second spherical bearing or the second eccentric bushing;
   securing the second moveable coupling interface to the second support fitting of the wing; and
   coupling, by a second pin, the second eccentric bushing of the second moveable coupling interface to the second support fitting of the wing.

7. The method of claim 6, wherein the portion of the wing is an underside of the wing that is aft in relation to a front edge of the wing.

8. The method of claim 6, wherein the portion of the fuselage is in front of and below or above the wing.

9. The method of claim 6, wherein a length of the structural member between the first end and the second end is free.

10. The method of claim 9, wherein the length of the structural member is devoid of fasteners.

11. An aircraft, comprising:
    a fuselage including a first support fitting having a first flange;
    a wing coupled to the fuselage, wherein the wing includes a second support fitting having a second flange; and
    a system for securing a portion of the fuselage of to a portion of the wing, the system comprising:
      a structural member including a linear main body extending between a first end and a second end, wherein the first end includes a first clevis, and the second end includes a second clevis;
      a first moveable coupling interface that moveably secures the first end to the portion of the fuselage, wherein the first moveable coupling interface is secured to the first support fitting of the fuselage, wherein the first moveable coupling interface comprises a first spherical bearing rotatably retained within a first eccentric bushing, and wherein the first clevis couples to one or both of the first spherical bearing or the first eccentric bushing;
      a first pin coupled to the first eccentric bushing, wherein the first pin secures the first eccentric bushing to the first support fitting;
      a second moveable coupling interface that moveably secures the second end to the portion of the wing, wherein the second moveable coupling interface is secured to the second support fitting of the wing, wherein the second moveable coupling interface comprises a second spherical bearing rotatably retained within a second eccentric bushing, and wherein the second clevis couples to one or both of the second spherical bearing or the second eccentric bushing; and a second pin coupled to the second eccentric bushing, wherein the second pin secures the second eccentric bushing to the second support fitting, wherein the first end and the second end are not rigidly fixed in position with respect to the fuselage and the wing, wherein a length of the structural member between the first end and the second end is free, and wherein the length of the structural member is devoid of fasteners.

12. The aircraft of claim 11, wherein the portion of the wing is an underside of the wing that is aft in relation to a front edge of the wing, and wherein the portion of the fuselage is in front of and below or above the wing.

13. The system of claim 1, wherein each of the first end and the second end is moveable through different degrees of freedom relative to the fuselage and the wing via the first moveable coupling interface and the second moveable coupling interface.

14. The method of claim 6, wherein each of the first end and the second end is moveable through different degrees of freedom relative to the fuselage and the wing via the first moveable coupling interface and the second moveable coupling interface.

15. The system of claim 1, wherein the first eccentric bushing comprises a first pin passage, wherein the first pin passage receives and retains the first pin, wherein the second eccentric bushing comprises a second pin passage, and wherein the second pin passage receives and retains the second pin.

16. The system of claim 1, wherein the first spherical bearing comprises a first pin passage, wherein the first pin passage receives and retains the first pin, wherein the second spherical bearing comprises a second pin passage, and wherein the second pin passage receives and retains the second pin.

17. The system of claim 1, wherein the first eccentric bushing comprises a first pin passage, wherein the second eccentric bushing comprises a second pin passage, wherein the first spherical bearing comprises a third pin passage that is coaxial with the first pin passage, wherein the first pin passage and the third pin passage receive and retain the first pin, wherein the second spherical bearing comprises a fourth pin passage that is coaxial with the second pin passage, and wherein the second pin passage and the fourth pin passage receive and retain the second pin.

18. The aircraft of claim 11, wherein the first eccentric bushing comprises a first pin passage, wherein the first pin passage receives and retains the first pin, wherein the second eccentric bushing comprises a second pin passage, and wherein the second pin passage receives and retains the second pin.

19. The aircraft of claim 11, wherein the first spherical bearing comprises a first pin passage, wherein the first pin passage receives and retains the first pin, wherein the second spherical bearing comprises a second pin passage, and wherein the second pin passage receives and retains the second pin.

20. The aircraft of claim 11, wherein the first eccentric bushing comprises a first pin passage, wherein the second eccentric bushing comprises a second pin passage, wherein the first spherical bearing comprises a third pin passage that is coaxial with the first pin passage, wherein the first pin passage and the third pin passage receive and retain the first pin, wherein the second spherical bearing comprises a fourth pin passage that is coaxial with the second pin passage, and wherein the second pin passage and the fourth pin passage receive and retain the second pin.

* * * * *